April 18, 1950     L. A. MAJNERI     2,504,859
BRAKE RELEASE VALVE

Filed Dec. 11, 1944     2 Sheets-Sheet 2

INVENTOR.
LUDWIG A. MAJNERI
BY
Whittemore Hulbert & Belknap
ATTORNEYS

Patented Apr. 18, 1950

2,504,859

UNITED STATES PATENT OFFICE 2,504,859

BRAKE RELEASE VALVE

Ludwig A. Majneri, Grosse Pointe, Mich., assignor to The Warner Aircraft Corporation, Detroit, Mich., a corporation of Michigan Application December 11, 1944, Serial No. 567,657

3 Claims. (Cl. 277—20)

This invention relates generally to valve assemblies and refers more particularly to a valve assembly capable of being installed in a hydraulic braking system for accelerating release of the brake or brakes in the system.

One of the principal objects of this invention is to provide a valve assembly having means for by-passing fluid from the hydraulic brake actuator to a storage chamber immediately upon release of the brake applying means. Thus the fluid pressure in the hydraulic brake actuator is practically instantaneously dropped sufficiently to allow the brake friction means to disengage from the braking surface on the brake drum, and as a result, dragging of the brake by delayed release is eliminated.

Still another object of this invention is to provide a valve assembly which is instantaneously responsive to a drop in pressure in the hydraulic actuator resulting from releasing the brake applying means to not only by-pass fluid from the actuator to the chamber but to also return fluid from the hydraulic actuator to the fluid reservoir usually forming a part of hydraulic braking systems and to enable return of the fluid in the chamber to the reservoir after the brake is completely released.

The foregoing as well as other objects will be made more apparent as this description proceeds, especially when considered in connection with the accompanying drawing wherein.

Figure 1:
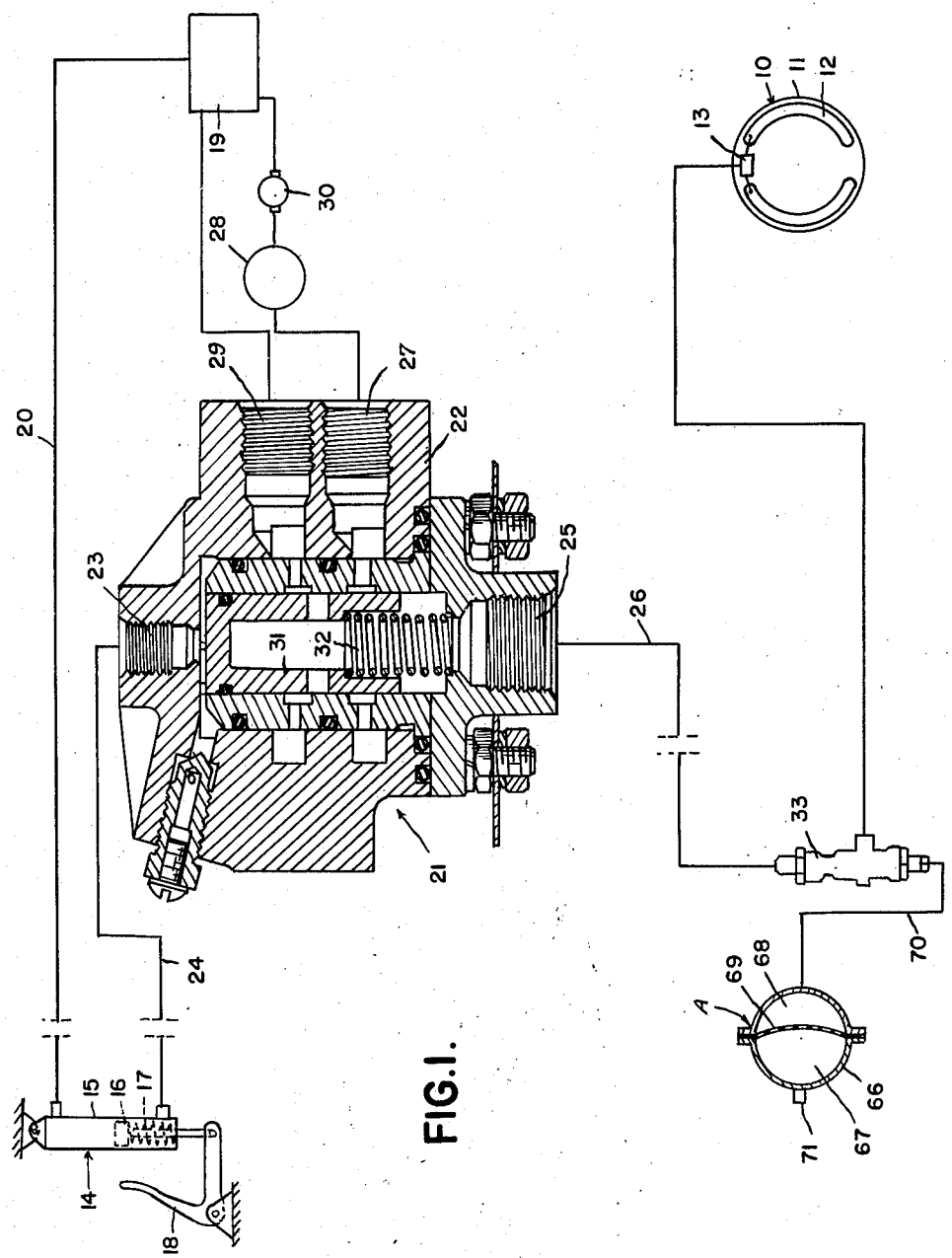
Figure 1 is a diagrammatic view of a braking system embodying the valve assembly forming the subject matter of this invention.

In Figure 1 of the drawing I have shown a typical hydraulic braking system of the type usually employed in connection with aircraft, although it will be understood from the following description that the invention may be used in practically any type of hydraulic braking system wherein it is desirable to provide instantaneous release of the brake or brakes in the system.

In general, the braking system shown in Figure 1 comprises a brake 10 having a brake drum 11 and having brake friction means 12 suitably supported within the drum. The brake friction means 12 are adapted to be moved outwardly into frictional engagement with the braking surface on the drum 11 by a hydraulic actuator 13. The hydraulic actuator 13 may be of any accepted construction and is usually supported within the drum 11 between adjacent ends of the friction means.

Operation of the brake 10 is initiated by a pressure producing device or master cylinder 14. The master cylinder 14 may also be of any suitable design and is shown in Figure 1 as comprising a cylinder 15 having a piston 16 supported therein for sliding movement in opposite directions. The piston 16 is normally urged in an upward direction in the cylinder 15 by a spring 17 and is moved downwardly against the action of the spring by a manually operable control 18. The upper end of the cylinder communicates with a reservoir 19 through the medium of a conduit 20, and the lower end of the cylinder 15 communicates with a power valve 21.

The power valve 21 selected for the purpose of illustration is of the same type shown in my copending application Serial No. 546,347, filed July 24, 1944, and now abandoned. Briefly, the power valve comprises a casing 22 having an intake port 23 communicating with the lower end of the master cylinder 15 through the medium of a conduit 24 and having an outlet port 25 which communicates with the actuator 13 through the medium of a supply line 26. In addition, the casing 22 has a second inlet port 27 which communicates with an accumulator 28 and is also provided with a second outlet port 29 which communicates with the reservoir 19. It may be pointed out at this time that the accumulator 28 contains braking fluid which is maintained at a relatively high pressure by a pump 30.

A valve 31 is supported in the casing 22 for movement in opposite directions. The valve 31 is normally urged to the position shown in Figure 1 by a spring 32 acting upon the lower end of the valve. When the valve is in this position the ports 25 and 29 are connected in order to establish communication between the hydraulic actuator 13 and the reservoir 19.

The valve 31 is moved downwardly against the action of the spring 32 by fluid pressure entering the port 23 from the master cylinder 14. When the valve is in its lowermost position, the port 29 is closed and the port 27 is opened to the port 25 to supply fluid under pressure from the accumulator 28 to the brake actuator 13. As a result the actuator 13 moves the brake friction means 12 outwardly against the braking surface on the drum 11.

The releasing valve forming the subject matter of this invention is connected in the line 26 between the power valve 21 and the hydraulic brake actuator 13. This releasing valve is indicated in Figure 1 by the reference character 33 and comprises a casing 34 open at opposite ends for respectively receiving the fittings 35 and 36. Suitable O-rings 37 are provided for sealing the joints between the fittings and casing. The fitting 35 has a port 38 which is connected to the line 26 or power valve 21, and the fitting 36 has a port 39 which is connected to a storage chamber A, to be more fully hereinafter described. The casing 34 is provided with a third port 40 intermediate the ports 38 and 39 for connection to the hydraulic actuator 13.

Figure 2:
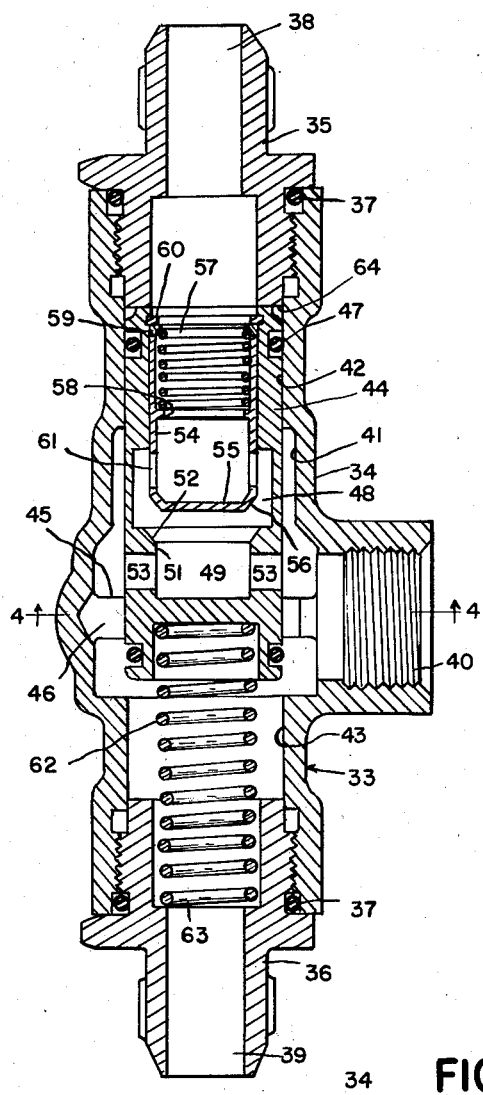
Figure 2 is a sectional view through the brake releasing valve shown in Figure 1.
Figure 3:
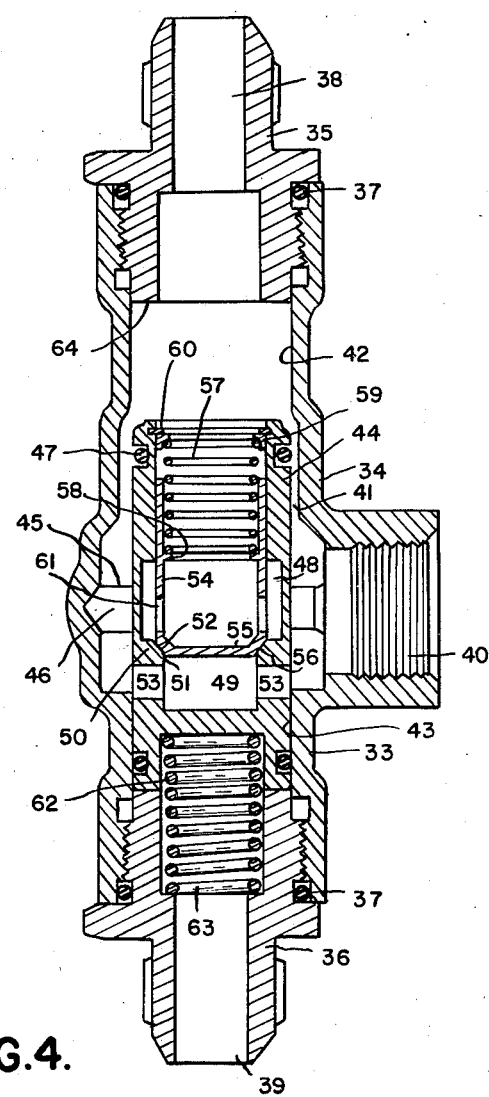
Figure 3 is a view similar to Figure 2 showing the valve in a different position.
Figure 4:
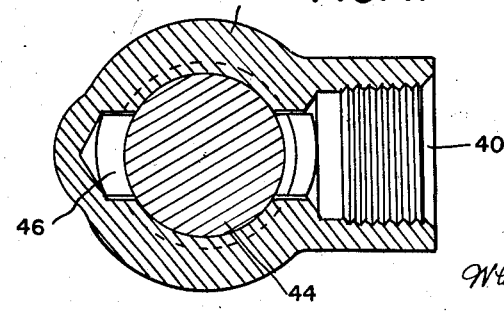
Figure 4 is a cross sectional view taken substantially on the plane indicated by the line 4—4 of Figure 2.

As shown in Figures 2 and 3 of the drawing, the casing 34 is also formed with a cylindrical chamber 41 intermediate the ends thereof in direct communication with the port 40. In addition the casing is formed with reduced cylindrical portions 42 and 43 at opposite ends of the chamber 41. A valve member 44 is movable in opposite directions in the casing 34 and the opposite ends of the valve member alternatively slidably engage the walls of the cylindrical portions 42 and 43. The intermediate portion of the valve member 44 is slidably supported by a partition 45 in the chamber 41, and suitable openings 46 are formed in the partition to enable free flow of fluid throughout chamber 41. Also suitable O-rings 47 are respectively mounted on opposite ends of the valve member 44 to prevent the escape of fluid under pressure past these ends when the latter respectively occupy positions in the cylindrical portions 42 and 43 of the casing.

The valve member 44 is formed with two vertically spaced chambers 48 and 49 separated by a transverse wall 50 having a port 51 therethrough surrounded at the upper end with a conically shaped valve seat 52. The chamber 49 communicates with the chamber 41 in all positions of the valve member 44 through a plurality of circumferentially spaced ports 53. However, communication between the chambers 48 and 49 is controlled by a valve member 54 in the form of a sleeve closed at the bottom by a wall 55 and having a conically shaped surface 56 engageable with the correspondingly shaped seat 52 to close the port 51. The valve 54 is normally urged to the position shown in Figure 3 of the drawing wherein the surface 56 on the valve is held in engagement with the seat 52 by a relatively weak spring 57 located within the valve 54 with the lower end engaging a shoulder 58 on the valve and with the upper end engaging a washer 59 held in position in the valve 44 by a snap ring 60.

The upper end of valve 54 is open to receive fluid passing downwardly into the casing 34 through the port 38, and the side walls of the valve 54 are provided with ports 61 which communicate with the chamber 48. Thus it will be noted that while the valve 54 is carried by the valve member 44 it operates entirely independently of the latter. In this connection attention is also called to the fact that the valve 44 is normally urged to the position shown in Figure 2 of the drawing by a spring 62 supported in the casing below the valve member 44. As shown, the top of the spring engages the bottom of the valve member 44, and the lower end of the spring abuts a shoulder 63 on the fitting 36. It follows from the above that the spring 62 normally urges the valve member 44 to the position shown in Figure 2 of the drawing wherein the upper end of the valve member 44 extends into the portion 42 of the chamber and engages a shoulder 64 formed by the bottom of the fitting 35. In this position the lower end of the valve member 44 assumes a position in the chamber 41 above the reduced portion 43 and communication is established between the chamber 41 and the port 39 through the end portion 43 of the casing 34.

Referring now to the operation of the valve assembly and assuming that the master cylinder 11 has been operated to supply fluid under pressure to the line 26 through the power valve 21, it will be noted that this fluid under pressure enters the valve casing 34 through the port 38. The fluid entering the port 38 passes into the valve 54 and acts on the wall 55 to move the valve member 44 to the position shown in Figure 3 of the drawing wherein the upper end of the valve member 44 assumes a position in the chamber 41 slightly below the cylindrical portion 42 of the casing 34. In this position of the valve member 44 fluid is free to pass into the chamber 41 and through the port 40 to the hydraulic actuator 13 to apply the brake 10. Fluid is prevented from escaping into the lower cylindrical portion of the casing 34 by reason of the fact that the lower end of the valve member occupies a position in the portion 43 and is sealed by the lower O-ring 47. Assuming now that the operator releases the control 18, it will be noted that the piston 16 in the master cylinder is returned to its inoperative position in the cylinder by the spring 17. As a result of this movement of the piston 16, fluid in the master cylinder escapes into the reservoir 19 through the conduit 20. Also the pressure in the power valve 21 is reduced to such an extent as to permit the spring 32 to move the valve member 31 to the position shown in Figure 1 of the drawing wherein the ports 25 and 29 are connected to establish communication between the hydraulic brake actuator 13 and reservoir 19. As a result of the above, the pressure in the brake actuator 13 is reduced.

As the pressure in the line 26 or actuator 13 drops, the valve member 44 is moved upwardly in the casing 34 by the spring 62 to the position shown in Figure 2 of the drawing. As the lower end of the valve member 44 moves out of the lower end 43 of the casing, fluid from the hydraulic actuator 13 is immediately by-passed into the chamber A through the port 39 and the brake 10 is instantaneously released.

Releasing of the brake is further accelerated by opening the valve 54. As shown in Figure 2 of the drawing, fluid returning through the port 40 enters the chamber 49 in the valve member 44 and moves the valve 54 upwardly against the relatively weak spring 57. As a result fluid flows into the chamber 48 through the port 51 and into the valve 54 through the ports 61. Inasmuch as the top of the valve 54 is open, it follows that the fluid passes through the port 38 into the line 26 and back to the reservoir 19 through the power valve 21. It has been stated above that fluid from the actuator 13 is by-passed by the valve 33 to a storage chamber A. This chamber comprises a tank 66 divided into two compartments 67 and 68 by a flexible diaphragm 69. The compartment 68 communicates directly with the port 39 of the releasing valve 33 through a relatively short conduit 70, and the compartment 67 is equipped with an air valve 71 through which air may be introduced into the compartment 67 to initially load the diaphragm. The pressure provided in the compartment 67 is considerably lower than the brake applying pressure, but is sufficient to return practically all of the fluid in the compartment 68 to the line 26 or reservoir 19 after the brake friction means 12 is completely released from the brake drum 11.

What I claim as my invention is:

1. A valve assembly comprising a casing having a chamber provided with spaced first and second ports, a third port intermediate the first and second ports, a valve member slidably supported in the chamber, parts on the valve member responsive to movement of the valve member in one direction to close communication between the first and third ports and to establish communication between the second and third ports, said parts being responsive to movement of the valve member in the opposite direction to open communication between the first and third ports and to close communication between the second and third ports, a chamber in the valve member having a fluid connection with the third port at all positions of said valve member and communicating with the first port, and a valve element slidably supported in the valve member and having fluid pressure responsive means for closing communication between the first port and chamber in the valve member in response to fluid pressure admitted through the first port.

2. A valve assembly comprising a casing provided with a chamber having reduced cylindrical portions spaced from each other by an enlarged cylindrical portion, a first port in one of the reduced portions and a second port in the other reduced portion, a third port in the enlarged portion, a valve member supported in the chamber for sliding movement and having axially spaced portions alternately movable into and out of the reduced portions of the chamber upon movement of the valve member in opposite directions, means on the valve member adjacent opposite ends thereof respectively engageable with the reduced portions of the chamber to close communication between the third port and the first and second ports, a chamber in said valve member having a fluid connection with the enlarged intermediate portion of the chamber in the casing at all positions of said valve member and communicating with the first port, and a valve element carried by said valve member and having fluid pressure responsive means for closing communication between the valve member chamber and first port in response to fluid pressure admitted to the casing chamber through the first port.

3. A valve assembly comprising a casing provided with a chamber having reduced cylindrical portions spaced from each other by an enlarged cylindrical portion, a first port in one of the reduced portions and a second port in the other reduced portion, a third port in the enlarged portion, a valve member supported in the chamber for sliding movement and having the opposite ends alternately movable into and out of the reduced portions of the chamber upon sliding movement of the valve member in opposite directions to respectively close communication between the third port and said first and second ports, a chamber in the valve member having a fluid connection with the third port through the intermediate enlarged portion of the casing chamber at all positions of said valve member and open to communication with the first port, a valve element slidably supported in the valve member chamber and having fluid pressure responsive means for closing communication between the first port and valve member chamber in response to fluid pressure admitted to the casing through the first port, spring means normally urging the valve member to a position wherein the first port is closed and the second port is open thereby, and spring means resisting opening movement of the valve element by the fluid under pressure in said valve member chamber.

LUDWIG A. MAJNERI.

REFERENCES CITED

The following references are of record in the file of this patent:

UNITED STATES PATENTS

| Number | Name | Date |
|---|---|---|
| 1,645,798 | Callan | Oct. 18, 1927 |
| 1,726,102 | Forman | Aug. 27, 1929 |
| 2,024,628 | Craig | Dec. 17, 1935 |
| 2,248,850 | Campbell | July 8, 1941 |
| 2,300,694 | Overbeke | Nov. 3, 1942 |
| 2,358,228 | Hoof | Sept. 12, 1944 |
| 2,362,945 | Stephens | Nov. 14, 1944 |
| 2,445,505 | Ashton | July 20, 1948 |